(12) United States Patent
Jeffers

(10) Patent No.: US 7,650,673 B2
(45) Date of Patent: Jan. 26, 2010

(54) ADJUSTABLE ROPE TIE FOR ANIMALS AND MOVABLE OBJECTS

(76) Inventor: Dennis L. Jeffers, 18750 CC Rd., Dearborn, MO (US) 64339

( * ) Notice: Subject to any disclaimer, the term of this patent is extended or adjusted under 35 U.S.C. 154(b) by 0 days.

(21) Appl. No.: 12/411,174

(22) Filed: Mar. 25, 2009

(65) Prior Publication Data

US 2009/0260194 A1     Oct. 22, 2009

Related U.S. Application Data

(60) Provisional application No. 61/124,924, filed on Apr. 21, 2008.

(51) Int. Cl.
*F16G 11/00* (2006.01)
(52) U.S. Cl. .................. 24/129 R; 24/131 R; 24/131 C; 54/34; 54/64
(58) Field of Classification Search .................. None
See application file for complete search history.

(56) References Cited

U.S. PATENT DOCUMENTS 273,191 A    2/1883  Thomas
842,459 A    1/1907  Hellweg
843,689 A    2/1907  McClintock
873,027 A *  12/1907 Davis ........................ 24/131 R
3,055,333 A * 9/1962  Stanley ........................ 114/210
6,684,613 B2 2/2004  Blocker
7,028,641 B1 4/2006  Martin
D567,457 S   4/2008  Wall

* cited by examiner

*Primary Examiner*—Jack W. Lavinder
(74) *Attorney, Agent, or Firm*—Lathrop & Gage LLP

(57) ABSTRACT

A rope tie for an animal or other movable object comprising a helical coil fixedly or removably attached to a support. A free end of a rope is inserted through a first loop of the coil toward a second loop of the coil, then under, around, and through the second loop of the coil. When the animal or movable object pulls on an opposite end of the rope, the rope moves out of the coil until it tightens around the second loop and ceases moving, thus restricting or stopping the movement of the animal or movable object. The free end of the rope may be placed on a hook to reduce the movement of the rope through the coil. Slack in the portion of rope extending from the coil to the animal or movable object may be removed or reduced by pulling on the free end of the rope.

15 Claims, 4 Drawing Sheets

ADJUSTABLE ROPE TIE FOR ANIMALS AND MOVABLE OBJECTS

PRIORITY

This application claims priority to U.S. Provisional application Ser. No. 61/124,924 filed Apr. 21, 2008, the disclosure of which is incorporated herein by reference.

FIELD OF INVENTION

The field of the invention is adjustable rope tie devices for use in connection with horses, dogs, boats, tree trimming and other applications where the object or animal tied may need an additional length of rope after being secured.

BACKGROUND OF INVENTION

Many objects and animals must be tethered by ropes to keep them from moving away from a desired location.

Horses and dogs, for example, must be trained to calmly accept being tied to a stationary object. Young horses not accustomed to being tied in a stationary position often panic and attempt to pull away from the stationary object. Similarly, older horses spoiled in their training, may panic, feel trapped, and pull back in panic or fight when tied. Most dogs, too, will pull back on a secured leash or rope to escape and attend to other activities of more interest to the dog. If additional rope is not allowed to play out in these situations, the animal's panic, pulling, and resistance increase.

Many inanimate objects, such as boats, must also be tied by a rope to a dock or other object, but need a certain amount of slack or extra rope when waves or other water movement cause them to move and pull on the rope. If slack is not provided in these instances, the boat may strike, or repeatedly strike, nearby objects and be damaged.

In tree trimming and removal operations, an additional length of rope may also be needed to permit some movement in the tree limb or other part of the tree being cut or removed.

Indeed, there are many applications in which an object must be secured with a rope and, after securing or tying, require an additional length of rope due to environmental forces or conditions that cause the object to move and pull on the rope by which it is secured.

Many conventional, prior art rope ties do not easily allow an additional length of rope to be extended to accommodate for the movement of the animal or other tied object. If such rope ties do allow for additional rope to be extended in order to permit movement, there is usually no convenient way to retrieve the additional rope, or slack, once it is extended.

Many existing rope ties require the rope to be knotted to an anchor of some type. When the tied object moves, the knot tightens and may be very difficult to untie in order to provide an additional length of rope to accommodate movement. When the slack or additional rope is no longer needed the knot must be untied and retied in order to secure the object or animal with the desired length of rope and tension. Since it may be difficult for the user to know in advance the amount of slack needed for a particular application, or may be difficult to knot the rope to provide the optimal amount of slack, it is often necessary to secure an animal or object subject to movement several times—i.e., by trial and error—to achieve the optimal or desired rope length, which is time consuming and requires constant attention to the tie during the adjustment period.

Mechanical and spring loaded ties have been used to attempt to achieve more flexible and adjustable tying arrangements; however, they have movable parts that are subject to mechanical failure or unexpected rapid movements that may further panic or scare an animal and generate another round of panic, anxiety and pulling or, in the case of other movable objects, cause unexpected and undesirable movements of the object tied. Many mechanical ties do not provide a secure, solid attachment to a fixed support, and some mechanical ties must be held by a user who may not be strong enough to properly resist the movement of large animals or objects or quick enough to move with the changing play in the rope.

SUMMARY OF INVENTION

The tying device of the invention allows a limited, adjustable amount of rope to slide or play out of the tie. The slack in the rope created by such play out is easily retrieved when the slack is no longer needed or desired.

The tying device of the invention comprises a helical coil having one or more loops. The ends of the helical coil are straightened. The straighten ends of the coil are permanently attached to a base or mounting plate, which is, in turn, secured to a fixed support such as a wall, post, transport trailer, tree, or other massive object. Upright hooks are attached to the plate alongside the helical coil, one above the other.

In an alternative, portable embodiment, the helical coil has one end secured to the other end to form a frame or bracket. An extension from one of the ends of the coil forms a hook. A link is removably secured to both the bracket and an anchor having a threaded extension or stub. The threaded extension or stub of the anchor may be screwed into a wall, post, tree, transport trailer, or other supporting object. The portable embodiment allows the tying device to be used in various locations where it is possible to secure the threaded device to a support.

The portable tie may also be used with multiple, more permanent anchors which may be attached to multiple supports in a variety of convenient locations. The anchors may, but need not, be screwed into the fixed support. Instead, the anchor may be secured to the fixed support in a more permanent manner by bolts, plates, welds, nails, or rivets. Alternatively, the link may be connected to hooks, loops, rings, or other suitable anchors that form a part of the support structure. Of course, the anchors may be removably attached to support structures, as well.

The portable embodiment of the tie allows multiple anchors to be attached to multiple, fixed supporting objects in various locations, so that the portable tying device may be removably secured to the anchor when the animal or other movable object is in the vicinity of the anchor. For example, it may be desirable to tether or tie a horse to a barn, a tree in a pasture, a trailer, a fence, or some other support when the horse is in the vicinity of such support. In such cases, anchors may be attached to nearby supports in each location. The portable tying device may then be easily secured to the anchor when the horse arrives at the location of the anchor and easily removed from the anchor when the horse leaves the location of the anchor.

In use, the lead or free end of the rope secured to a horse, dog, or other movable object is inserted through the hole or open space in the first helical loop, around the bottom of the second helical loop, through the hole or open space in the second loop, and, if desired, placed on the hook, thus securing the animal or other moving object. Alternatively and equivalently, the free end of the rope is bent in a U shape and placed over the top of the first loop; then the free end of the rope is wound around the second loop and, if desired, placed on the hook, thus, securing the animal or moving object. This placement of the rope in the coil requires only one hand and can be done quickly, efficiently, easily. Subsequent movement of the animal or other moveable object allows an additional length of rope, but not the entire end of the rope, to play out of the coil when the animal or movable object moves.

The length of rope that is allowed to play out of the coil, and thus, the overall allowed tension of the rope may be altered by placing the end of the rope over the hook that accompanies the tie. Placing the rope over the hook allows less rope to extend or play out of the coil. In the plate-mounted embodiment of the tie, two or more hooks may be provided. Placing the lead or free end of the rope over the lower hook restricts the amount of rope that may slide out of the coil. Placing the free end of the rope over the upper hook further decreases the amount of rope that may play out of the coil and, thus, increases the overall tension in the rope. The use of the hooks, therefore, allows the user to adjust the play and tension of the rope. Moreover, the tension and play may be easily and quickly adjusted by simply removing the lead or free end of the rope from the hook or moving to another hook when there are multiple hooks.

DETAILED DESCRIPTION OF THE INVENTION

Figure 1:
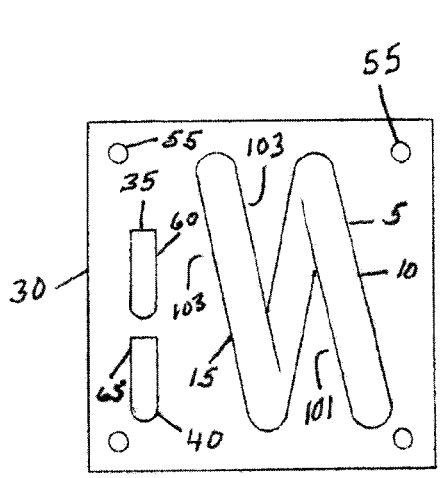
FIG. 1 is a front plan view of a plate-mounted tying device of the invention.

As shown in FIGS. 1 though 5, a rope tie 1 of the invention comprises a helical coil 5 having a first loop 10 and a second loop 15. End portions 20 of the coil 5 are straightened. Ends 25, 26 of the end portions 20 are welded or otherwise permanently attached to a plate 30. Upper hook 35 and lower hook 40 are also welded or permanently attached to the plate 30 alongside the coil 5.

Figure 5:
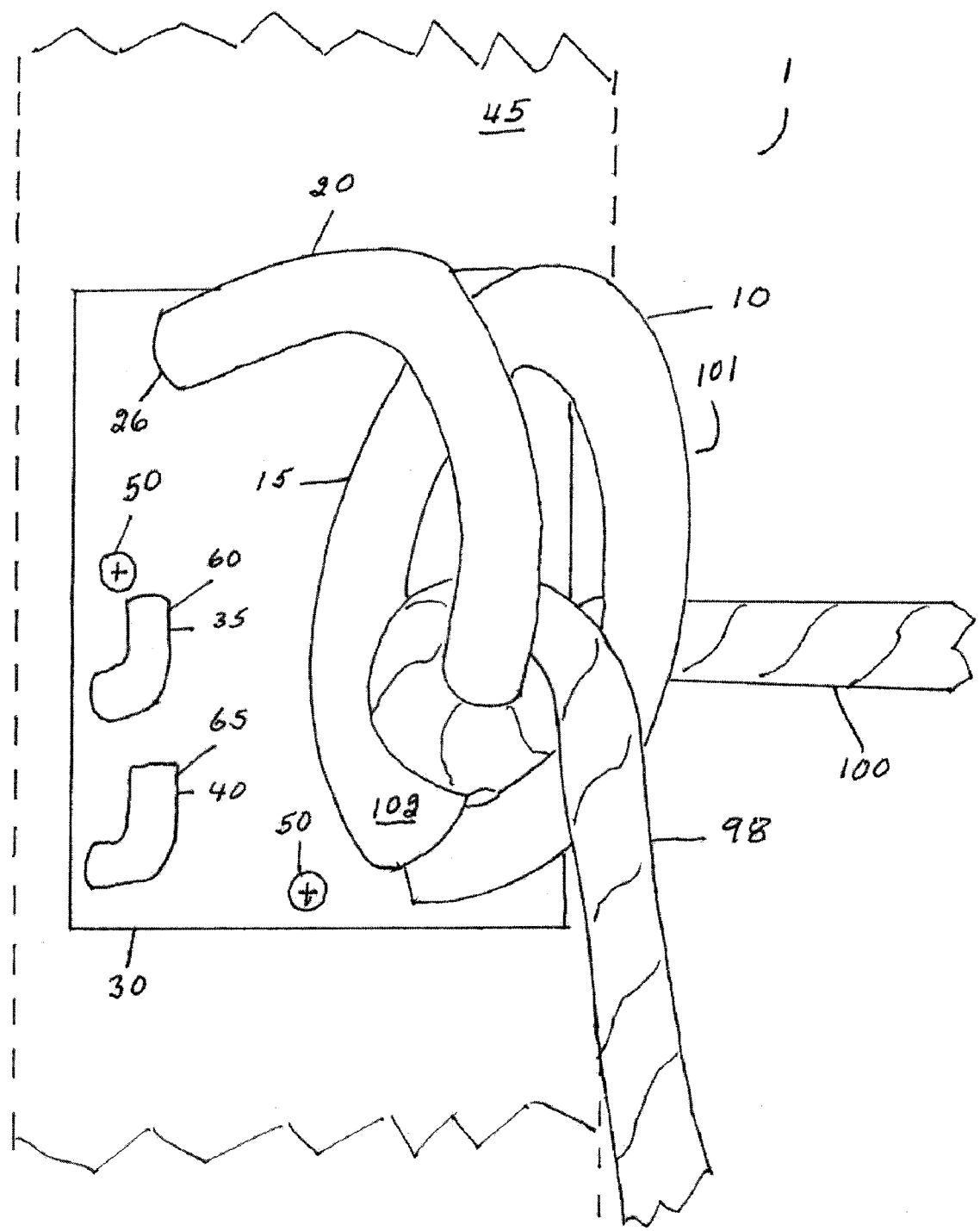
FIG. 5 is a perspective view of the tying device of FIG. 1 secured to a support and showing the rope placed in the device and under tension.
Figure 6:
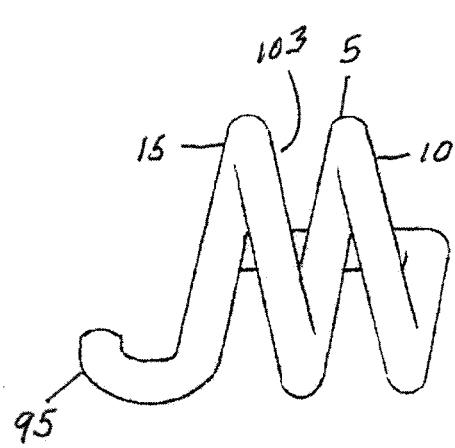
FIG. 6 is a front plan view of an alternative portable embodiment of the tying device of the invention.

The plate 30 is secured to or mounted on a fixed or relatively fixed support 45, as shown by dashed lines in FIG. 5. The plate 30 may be secured to the support 45 by screws 50, as shown in FIG. 5, or by any other means of permanent attachment. As shown in FIG. 1, holes 55 may be placed or formed in the plate 30 so that screws, bolts, or other attaching means may be secured to the supporting structure 45 through the holes 55.

Figure 4:
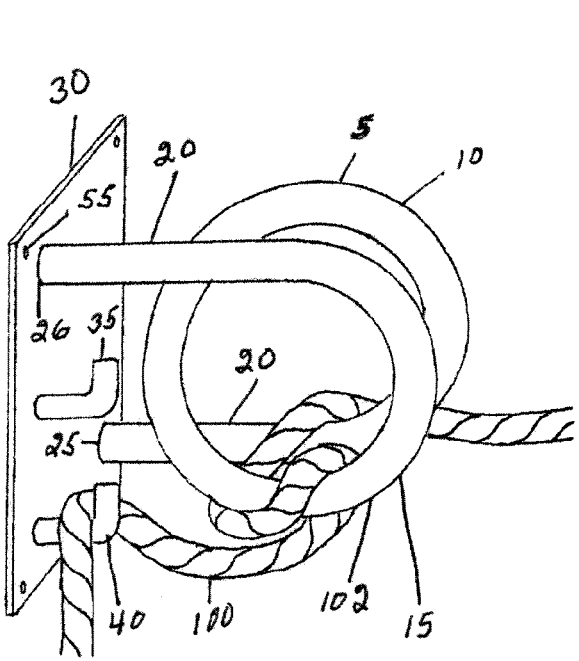
FIG. 4 is a perspective view of the tying device of FIG. 1 showing a portion a length of a free end of a rope placed in the device with a portion of the free end of the rope on one of the hooks.
Figure 2:
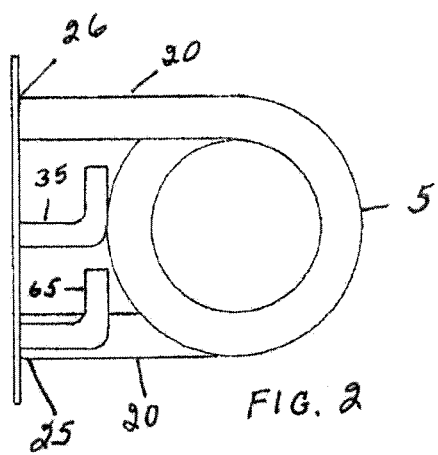
FIG. 2 is a side view of the tying device or FIG. 1 showing the orientation of hooks secured to a mounting plate.
Figure 3:
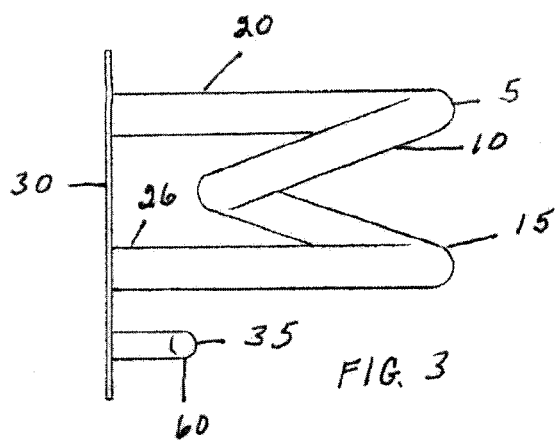
FIG. 3 is a top plan view of the tying device or FIG. 1.

Hooks 35, 40 are bent so they each have vertical portions 60 and 65, respectively, as best shown in FIGS. 2, 4, and 5.

The coil 5, plate 30, and hooks 35, 40 are made of durable, weather resistant material such as stainless steel. The coil 5, plate 30, and hooks 35, 40 may also be made of plastic or any other durable, weather resistant material that allows the coil ends 25, 26 to be permanently molded or fixedly attached to the plate 30, and the plate 30 fixedly attached to the support 45. The parts of the tie 1 should be of sufficient durability and strength to allow the tie 1 to be used out of doors and provide the necessary strength to withstand the forces generated by the movement of large animals or other objects.

As shown in FIGS. 6 through 10, an alternative portable rope tie 70 has a coil 5 with first and second loops 10, 15 that are the same as that of the rope tie 1, except that the end sections or portions 75, 76 of the coil 5 are bent or angled to form an open frame 80 with an opening therethrough.

Figure 10:
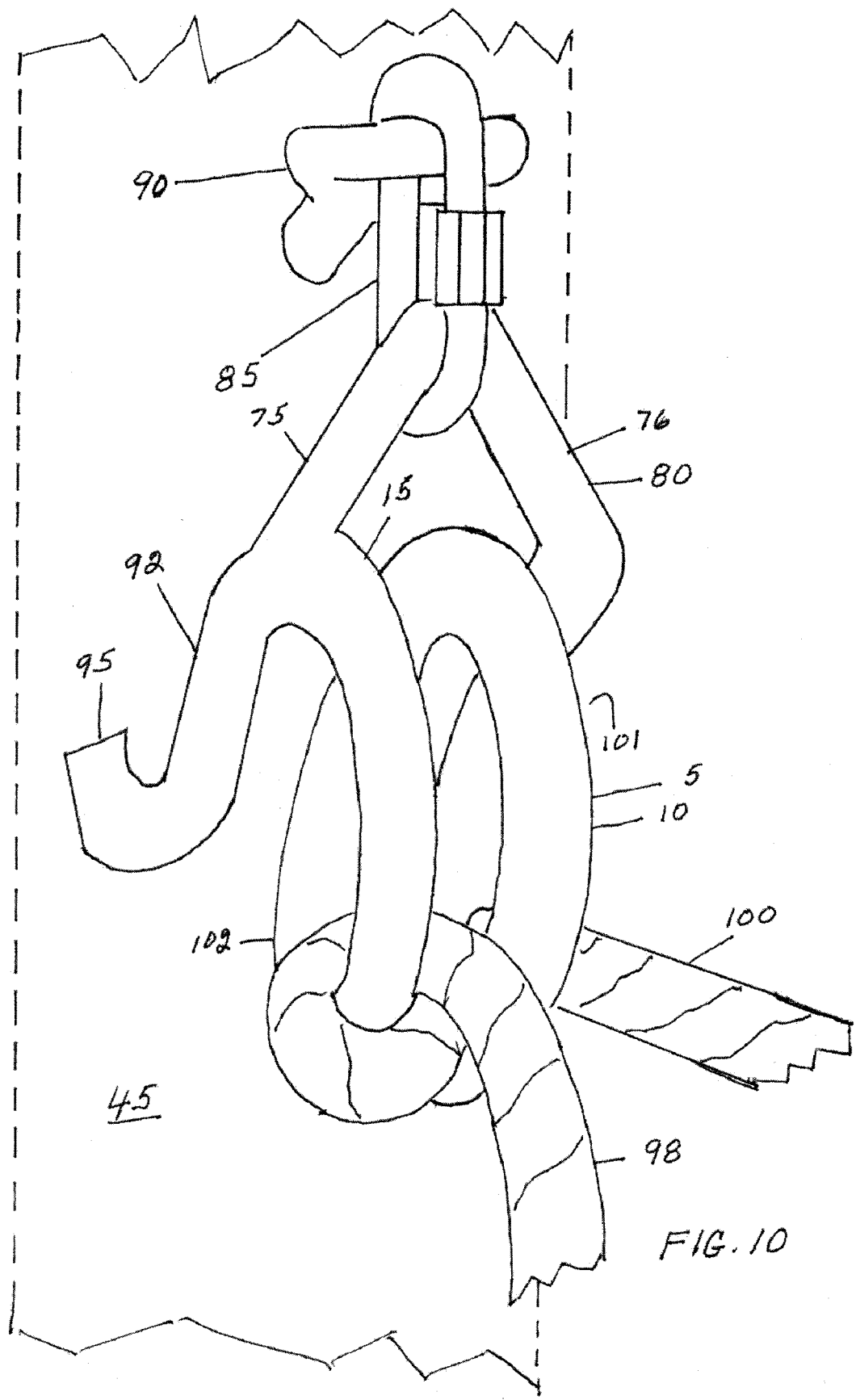
FIG. 10 is a perspective view of the portable tying device of FIG. 6 secured to a support and showing a rope placed in the device under tension.

A link or clasp 85 (see FIG. 10) that opens and closes is connected to the frame 80 as show in FIG. 10. The link 85 is also connected to a mount or anchor 90, which is in turn attached to the support 45, again as shown in FIG. 10.

An extension 92 of end portion 75 forms a hook 95, as best shown in FIGS. 6, 8, 9, and 10.

As shown in FIG. 10, the anchor 90 forms a hole 93 that allows the link or clasp 85 to be connected to the anchor 90. The anchor 90 may have a threaded stub 96 (threads not shown) that may be screwed into the support 45 to provide for a secure attachment for the anchor 90. However, the stub 96 and anchor 90 may also be made in other shapes and configurations that allow the anchor 90 to be securely attached to the support 45 by welding, nails, bolts, welding, or any suitable form of attachment. The anchor 90 may, of course, also be configured to be removably secured to the support 45 so that the anchor 90, as well as the coil 5 and link 85, may be moved from location to location.

The coil 5, anchor 90, link 85, and hook 95 of the portable tie 70 are also made of durable, weather resistant material such as stainless steel. As noted above, the parts of the portable tie 70 may also be made of plastic or any other durable, weather resistant material that allows them to be used out of doors and provides the necessary strength to withstand the forces generated by the movement of large animals or other objects.

Suitable supports 45 for the rope tie 1 or the portable rope tie 70 include any massive object that will not be dislodged by the movement of a horse, dog, boat, tree, trailer, motorized vehicle, or other moving or moveable object that is secured by the rope tie 1, 70. Most supports 45 will be fixed, practically unmovable supports; however, massive movable supports such as trucks or trailers may also be used as supports 45.

Figure 9:
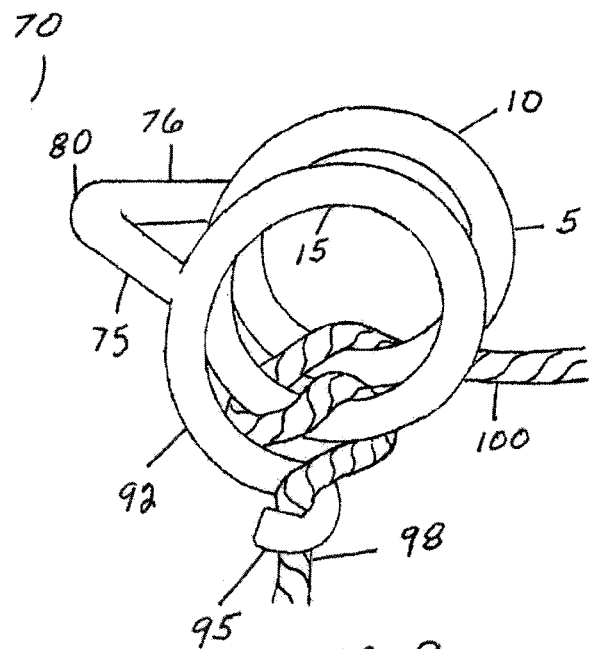
FIG. 9 is a perspective view of the portable embodiment of the tying device of FIG. 6 showing the rope placed in the portable tying device with the lead or free end of the rope placed on a hook of the portable device.
Figure 7:
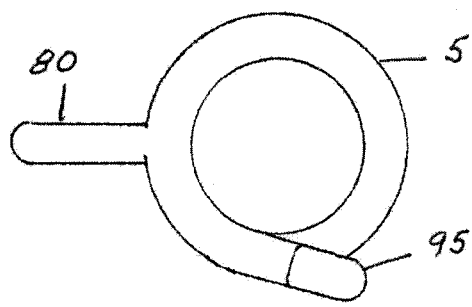
FIG. 7 is a side plan view of the portable embodiment of the tying device of FIG. 6.
Figure 8:
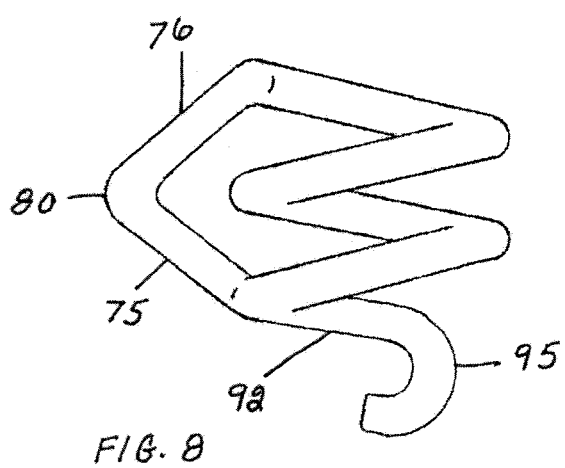
FIG. 8 is a top plan view of the portable embodiment of the tying device of FIG. 6.

Securing the animal or other moveable object to either the rope tie 1 or the portable rope tie 70 is performed in the same manner for both the rope tie 1 and the portable tie 70. In each device 1, 70, a lead or free end portion 98 of a rope 100—i.e., the end of the rope that is not attached to an animal or other moveable object—is inserted through the hole or open space 101 in the first helical loop 10, around the bottom 102 of the second helical loop 15, through the hole or open space 103 in the second loop 15, and, if desired, placed on the hook 35 or 40 of rope tie 1, as shown in FIGS. 4 and 5, or on the hook 95, as shown in FIG. 9, thus securing the animal or other moving object to the rope tie 1 or the rope tie 70, respectively. Alternatively and equivalently, the end portion 98 of the rope 100 is bent in a U shape and placed over the top of the first loop 10. Then, the free end 98 of the rope 100 is wound around the second loop 15 and, if desired, placed through one of the hooks 35, 40 of rope tie 1 or hook 95, if the portable embodiment 70 of the rope tie is being used, thus, securing the animal or moving object.

When the rope 100 is secured to the coil 5 in the manner stated in the immediately preceding paragraph, the configuration of the rope 100 in the coil 5 is as shown in FIGS. 4, 5, 9 and 10. This placement of the rope 100 in the coil 5 requires only one hand and can be done quickly, efficiently, and easily.

If the animal or object is not moving when secured to the coil 5, the rope 100 is relaxed, as shown in FIG. 4 in the case of the rope tie 1 and in FIG. 9 in the case of the portable rope tie 70. If the tied animal or object subsequently pulls away from the rope tie 1 or the portable rope tie 70, the rope 100 becomes taut, winds or closes more tightly around the coil 5, and may ride upward somewhat on the coil 5 as shown in FIGS. 5 and 10. As the rope 100 becomes taut due to the movement, the rope 100 is allowed to play out of the coil 5, and an additional length of the rope 100 is made available for the animal or other moving object. The play out of the rope 100, however, stops short of allowing the entire end portion 98 of the rope 100 to be removed from the coil 5, thus continuing to restrain and secure the animal or other moving object to the rope tie 1 or 70, as the case may be.

The length of the rope 100 that is allowed to play out of the coil 5, and, thus, the overall allowed tension of the rope 100 may be altered by placing the end portion 98 of the rope 100 over the hook that accompanies the tie—i.e., upper hook 35 or lower hook 40 of rope tie 1, or, hook 95 if the portable rope tie 70 is being used. Placing the rope over the hook 35, 40 or 95 allows less of the rope 100 to move or play out of the coil 5 due to the raised elevation of the end portion 98 of the rope 100, which causes the rope 100 to more quickly tighten on the coil 5.

In either rope tie 1 or portable rope tie 70, a maximum amount or length of the rope 100 may be allowed to play out of the coil 5 before the rope 100 tightens on the coil 5 if the end portion 98 of the rope 100 is not placed on the respective hooks 35, 40, or 95. This configuration of the rope 100 and the coil 5 is shown in FIG. 5 for the rope tie 1 and in FIG. 10 for the portable tie 70.

In rope tie 1, the end portion 98 of the rope 100 may be placed on the lower hook 40 to cause the rope to tighten on the coil 5 more quickly and, thus, allow less of the rope 100 to play out of the coil 5. If more tension and quicker tightening of the rope 100 is desired in rope tie 1, the end portion 98 of the rope 100 may be placed on the upper hook 35 of the rope tie 1, thus causing the rope to tighten even more quickly and allow even less of the rope 100 to play out of the coil 5 than when the end portion 98 is placed on the lower hook 40.

The interaction of the rope 100, the coil 5 and the hook 95 is essentially the same on the portable tie 70. Less rope play and quicker rope tension is permitted when the end portion 98 of the rope 100 is placed on the hook 95, as shown in FIG. 9, than when the end portion 98 of the rope 100 is not placed on the hook 95, as shown in FIG. 10.

As will be appreciated from the above description of the interaction of the rope 100 and the coil 5, it is very easy to relieve the slack in the rope 100 caused by the movement of the animal or moveable object tied to either rope tie 1 or portable rope tie 70. In either case the slack, or play out of additional lengths of the rope 100 may be very easily relieved, and the tension on the rope 100 increased, by simply pulling on the end portion 98 of the rope 100. Pulling on the end portion 98 of the rope 100 plays the rope 100 through the coil 5 in the opposite direction and shortens the length of the rope 100 secured to the animal or other moveable object. In addition, this relief of the slack in the rope 100 resets the rope 100 for subsequent movement of the animal or other object, which again allows the rope 100 to play out of the coil 5.

It will also be appreciated that it is very easy to regulate the play of the rope 100 through the coil 5 by placing the end portion 98 of the rope 100 on or off of the hook 40 of the rope tie 1 or the hook 95 of the portable rope tie 70. It is, of course, also convenient and easy to adjust the play and tension of the rope 100 in the rope tie 1 by moving the end portion 98 of the rope 100 from one of the hooks 35 or 40 to the other.

The adjustable tension and rope play are particularly useful in connection with animals of various sizes, ages, and strengths and in connection with movable objects such as small and large boats and trees or tree limbs.

Dogs or smaller horses, for example, have less strength and may be provided with a rope tie 1 or 70 in which the rope 100 is configured in the coil 5 and the hooks 35, 40, 95 so as to allow the animal to pull more of the rope 100 through the coil 5 or, alternatively, to pull the rope 100 through the coil 5 more easily. Larger horses and animals with greater strength may be provided with a rope tie 1 or 70 in which the rope 100 is configured in the coil 5 and the hooks 35, 40, 95 so as to present greater tension on the rope 100 and allow the animal to pull less of the rope 100 through the coil 5 or, alternatively, make it more difficult to pull the rope 100 through the coil 5.

The ability to adjust the play and tension of the rope 100 also allows a trainer to train animals to calmly accept a tighter tether or tie by gradually increasing the tension on the rope 100. It is also beneficial for trainers to increase the tension of the rope 100 after an animal has tried to flee and then calmed down, which, as shown above, is very easy with the ties 1 or 70.

The adjustable play of the rope 100 may also be used to advantage in tying boats or tree limbs to a fixed location. More massive objects, or objects that are subject to greater movement to environmental conditions or events, may be tied such that there is greater tension on the rope 100, whereas less massive objects, or objects that are subject to smaller movements due to environmental conditions, may be tethered with less tension on the rope 100.

I claim:

1. A rope tie for tying an animal or moveable object to a support, comprising:
   a rope having one end for securing to the animal or movable object and an opposite free end;
   a fixed support; and
   an uninterrupted helical coil having first and second consecutive loops, each of the loops defining an opening therethrough, the uninterrupted helical coil being operatively coupled to the fixed support;
   wherein the second loop has a bottom portion around which the free end of the rope is wound after the free end of the rope is passed through the opening in the first loop, such that when pulled by the animal or movable object the rope plays out of the coil until the rope tightens around the bottom portion of the second loop and ceases moving;
   wherein the first and second consecutive loops extend between first and second straightened ends; and
   wherein each of the first and second straightened ends is secured to the fixed support.

2. A rope tie for tying an animal or moveable object to a support, comprising:
   a rope having one end for securing to the animal or movable object and an opposite free end;
   a fixed support; and
   an uninterrupted helical coil having first and second consecutive loops, each of the loops defining an opening therethrough, the uninterrupted helical coil being operatively coupled to the fixed support;

wherein the second loop has a bottom portion around which the free end of the rope is wound after the free end of the rope is passed through the opening in the first loop, such that when pulled by the animal or movable object the rope plays out of the coil until the rope tightens around the bottom portion of the second loop and ceases moving;

wherein a frame is coupled to the uninterrupted helical coil at two points;

wherein the first and second consecutive loops extend between the two points; and wherein the frame is operatively coupled to the fixed support.

3. The rope tie of claim 2, wherein a removable link secures the frame to an anchor in the fixed support.

4. A rope tie for tying an animal or moveable object to a support, comprising:

a rope having one end for securing to the animal or movable object and an opposite free end;

a fixed support;

an uninterrupted helical coil having first and second consecutive loops, each of the loops defining an opening therethrough, the uninterrupted helical coil being operatively coupled to the fixed support; and a first hook having a fixed position relative to the first and second consecutive loops;

wherein the second loop has a bottom portion around which the free end of the rope is wound after the free end of the rope is passed through the opening in the first loop, such that when pulled by the animal or movable object the rope plays out of the coil until the rope tightens around the bottom portion of the second loop and ceases moving; and wherein the free end of the rope is placed on the first hook to reduce the amount of the rope that moves out of the uninterrupted helical coil before the rope tightens on the bottom portion of the second loop.

5. The rope tie of claim 4, further comprising a second hook having a fixed position relative to the first and second consecutive loops, the second hook being above the first hook, wherein the free end of the rope is placed on the second hook instead of the first hook to further reduce the amount of the rope that moves out of the uninterrupted helical coil before the rope tightens on the bottom portion of the second loop.

6. The rope tie of claim 5, wherein the first and second hooks are coupled to the fixed support apart from the uninterrupted helical coil.

7. A rope tie for tying an animal or moveable object to a support, comprising:

a rope having one end for securing to the animal or movable object and an opposite free end;

a fixed support;

an uninterrupted helical coil having first and second consecutive loops, each of the loops defining an opening therethrough;

means for securing the helical coil to the fixed support, the means meeting the helical coil outside of the first and second consecutive loops; and a first hook having a fixed position relative to the first and second consecutive loops;

wherein the free end of the rope is inserted through the first loop opening in a first direction and inserted through the second loop opening in a second direction generally opposite to the first direction, such that when pulled by the animal or movable object the rope plays out of the coil until the rope tightens around a portion of the second loop and ceases moving; and wherein the free end of the rope is placed on the first hook to reduce the amount of the rope that moves out of the uninterrupted helical coil before the rope tightens on the portion of the second loop.

8. The rope tie of claim 7, further comprising a second hook having a fixed position relative to the first and second consecutive loops, the second hook being above the first hook, wherein the free end of the rope is placed on the second hook instead of the first hook to further reduce the amount of the rope that moves out of the uninterrupted helical coil before the rope tightens on the portion of the second loop.

9. The rope tie of claim 7, wherein the free end of the rope is inserted:

through the opening in the first loop and toward the second loop;

then under the second loop;

then toward the first loop through the opening in the second loop; and then downward from the second loop.

10. A rope tie for tying an animal or moveable object to a support via a rope having an end secured to the animal or moveable object and an opposite free end, the rope tie comprising:

a fixed support; and an uninterrupted helical coil having first and second consecutive loops, each of the loops defining an opening therethrough, the fixed support being operatively coupled to the uninterrupted helical coil at points outside the first and second consecutive loops;

wherein the second loop has a bottom portion around which the free end of the rope may be wound after the free end of the rope is passed through the opening in the first loop, such that when pulled by the animal or movable object the rope plays out of the coil until the rope tightens around the bottom portion of the second loop and ceases moving;

wherein the first and second consecutive loops extend between first and second straightened ends; and wherein each of the first and second straightened ends is secured to the fixed support.

11. A rope tie for tying an animal or moveable object to a support via a rope having an end secured to the animal or moveable object and an opposite free end, the rope tie comprising:

a fixed support; and an uninterrupted helical coil having first and second consecutive loops, each of the loops defining an opening therethrough, the fixed support being operatively coupled to the uninterrupted helical coil at points outside the first and second consecutive loops;

wherein the second loop has a bottom portion around which the free end of the rope may be wound after the free end of the rope is passed through the opening in the first loop, such that when pulled by the animal or movable object the rope plays out of the coil until the rope tightens around the bottom portion of the second loop and ceases moving;

wherein a frame is coupled to the uninterrupted helical coil at two points;

wherein the first and second consecutive loops extend between the two points; and wherein the frame is operatively coupled to the fixed support.

12. The rope tie of claim 11, wherein a removable link secures the frame to an anchor in the fixed support.

13. A rope tie for tying an animal or moveable object to a support via a rope having an end secured to the animal or moveable object and an opposite free end, the rope tie comprising:
- a fixed support;
- an uninterrupted helical coil having first and second consecutive loops, each of the loops defining an opening therethrough, the fixed support being operatively coupled to the uninterrupted helical coil at points outside the first and second consecutive loops; and
- a first hook having a fixed position relative to the first and second consecutive loops;
- wherein the second loop has a bottom portion around which the free end of the rope may be wound after the free end of the rope is passed through the opening in the first loop, such that when pulled by the animal or movable object the rope plays out of the coil until the rope tightens around the bottom portion of the second loop and ceases moving; and
- wherein the free end of the rope is positionable on the first hook to reduce the amount of the rope that moves out of the uninterrupted helical coil before the rope tightens on the bottom portion of the second loop.

14. The rope tie of claim 13, further comprising a second hook having a fixed position relative to the first and second consecutive loops, the second hook being above the first hook, wherein the free end of the rope is positionable on the second hook instead of the first hook to further reduce the amount of the rope that moves out of the uninterrupted helical coil before the rope tightens on the bottom portion of the second loop.

15. The rope tie of claim 14, wherein the first and second hooks are coupled to the fixed support apart from the uninterrupted helical coil.

* * * * *